US010695875B2

(12) United States Patent
Shen

(10) Patent No.: US 10,695,875 B2
(45) Date of Patent: Jun. 30, 2020

(54) SOLDERING METHOD OF SOLDERING JIG

(71) Applicant: ASIA VITAL COMPONENTS CO., LTD., New Taipei (TW)

(72) Inventor: Meng Shen, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 59 days.

(21) Appl. No.: 15/925,711

(22) Filed: Mar. 19, 2018

(65) Prior Publication Data

US 2019/0283190 A1    Sep. 19, 2019

(51) Int. Cl.
| B23K 31/02 | (2006.01) |
| B23K 37/04 | (2006.01) |
| B23K 3/08 | (2006.01) |
| B23K 1/00 | (2006.01) |

(52) U.S. Cl.
CPC ........ B23K 37/0443 (2013.01); B23K 1/0016 (2013.01); B23K 3/087 (2013.01); B23K 31/02 (2013.01)

(58) Field of Classification Search
CPC .... B23K 1/00–206; B23K 2101/36–42; B23K 37/0443; B23K 31/02; B23K 3/087
USPC ................ 228/179.1–180.22, 165–169, 174, 228/244–262
See application file for complete search history.

(56) References Cited

U.S. PATENT DOCUMENTS

| 5,673,479 | A * | 10/1997 | Hawthorne | ............. | H01L 23/16 |
| | | | | | 228/179.1 |
| 5,982,629 | A * | 11/1999 | Shoji | ................... | H01L 21/4853 |
| | | | | | 361/760 |
| 6,492,616 | B1 * | 12/2002 | Tanaka | .................. | H01L 21/481 |
| | | | | | 219/121.71 |
| 6,593,220 | B1 * | 7/2003 | Yu | ........................ | H01L 21/2885 |
| | | | | | 228/180.22 |
| 7,143,927 | B2 * | 12/2006 | Hasegawa | ................ | H01J 9/241 |
| | | | | | 228/124.6 |
| 7,543,376 | B2 * | 6/2009 | Yoshino | ............... | H05K 3/4046 |
| | | | | | 228/179.1 |
| 8,871,631 | B2 * | 10/2014 | Lamprecht | .......... | H01L 21/4853 |
| | | | | | 438/612 |
| 2002/0158110 | A1 * | 10/2002 | Caletka | ................ | B23K 3/0623 |
| | | | | | 228/180.22 |
| 2003/0111518 | A1 * | 6/2003 | Dances | ................ | B23K 3/0638 |
| | | | | | 228/215 |
| 2003/0127500 | A1 * | 7/2003 | Pierson | ................ | B23K 3/0607 |
| | | | | | 228/246 |

(Continued)

FOREIGN PATENT DOCUMENTS

| JP | 01054797 A | * | 3/1989 | |
| WO | WO-2013171967 A1 | * | 11/2013 | ............. H05K 3/303 |

*Primary Examiner* — Kiley S Stoner
(74) *Attorney, Agent, or Firm* — Jackson IPG PLLC; Demian K. Jackson

(57) ABSTRACT

The present invention relates to a soldering method of a soldering jig. The soldering method comprises the steps of providing a substrate having a soldering area and at least one positioning area in which a positioning part is disposed in the positioning area, placing a workpiece on the substrate, positioning the workpiece through the positioning part, using a heating method to remove an isolating film on the workpiece, and placing a piece of solder in the soldering area of the substrate and then melting the piece of solder such that the workpiece is soldered to the soldering area through the piece of solder.

4 Claims, 9 Drawing Sheets

(56) References Cited

U.S. PATENT DOCUMENTS

| | | | | |
|---|---|---|---|---|
| 2005/0247761 | A1* | 11/2005 | Albanese | B23K 1/0016 228/201 |
| 2006/0027728 | A1* | 2/2006 | Akram | H01L 21/6835 249/78 |
| 2007/0045388 | A1* | 3/2007 | Farnworth | B23K 1/0016 228/244 |
| 2008/0057718 | A1* | 3/2008 | Omata | B23K 26/0676 438/694 |
| 2008/0076267 | A1* | 3/2008 | Oishi | B23K 26/0613 438/785 |
| 2009/0120680 | A1* | 5/2009 | Tanno | H01L 21/4853 174/263 |
| 2009/0294974 | A1* | 12/2009 | Leung | B23K 1/0016 257/772 |
| 2012/0152597 | A1* | 6/2012 | Yamada | B23K 1/0016 174/257 |
| 2012/0168209 | A1* | 7/2012 | Kato | H01L 23/15 174/255 |
| 2012/0241949 | A1* | 9/2012 | Sasaki | H01L 25/0657 257/737 |
| 2012/0273261 | A1* | 11/2012 | Yi | C23C 18/1653 174/255 |
| 2013/0082091 | A1* | 4/2013 | Matejat | H01L 21/4853 228/176 |
| 2014/0069817 | A1* | 3/2014 | Dang | H01L 24/11 205/122 |
| 2014/0138130 | A1* | 5/2014 | Chang | H05K 3/4697 174/257 |
| 2014/0301042 | A1* | 10/2014 | Stella | H05K 1/0204 361/709 |
| 2014/0332949 | A1* | 11/2014 | Davis | H01L 23/3735 257/712 |
| 2015/0278675 | A1* | 10/2015 | Finn | G06K 19/07783 235/492 |
| 2016/0029490 | A1* | 1/2016 | Vuono | B23K 1/0016 361/774 |
| 2016/0368829 | A1* | 12/2016 | Minami | C04B 37/026 |
| 2017/0103932 | A1* | 4/2017 | Takemura | H01L 23/49816 |
| 2017/0106471 | A1* | 4/2017 | Yoshii | B23K 26/142 |
| 2017/0154749 | A1* | 6/2017 | Torma | H01J 35/18 |
| 2017/0290099 | A1* | 10/2017 | Takebayashi | B23K 3/04 |

\* cited by examiner

SOLDERING METHOD OF SOLDERING JIG

BACKGROUND OF THE INVENTION

Field of the Invention

The present invention relates to a soldering method of a soldering jig and in particular to a soldering method of a soldering jig which are applied to a magnet wire.

Description of Prior Art

The soldering technique, commonly applied to various fields, is used to fix a workpiece to another object through solder. When soldering a magnet wire manually, the worker uses one hand to hold a soldering iron and the other hand to hold a solder wire or to fix the workpiece.

However, the traditional manual soldering suffers the following disadvantages:

(1) Higher soldering skill is required for a soldering technician. Professional training is necessary to obtain better performance.

(2) Manual soldering is prone to suffer the rupture of a magnet wire.

(3) Failure (e.g., an open circuit, a poor contact, excessive resistance) occurs easily at soldering points.

(4) The soldering results of the soldering points are not consistent. For example, excessive height of the soldering point causes interference with other parts.

(5) Low efficiency.

How to solve the problems and disadvantages of the above prior art is the target which the industry and the inventor strive to reach.

SUMMARY OF THE INVENTION

Thus, to effectively overcome the above problems, it is one objective of the present invention to provide a soldering method of a soldering jig, which can relax the requirements for the worker's skills.

It is another objective of the present invention to provide a soldering method of a soldering jig, which can prevent the rupture of a magnet wire.

It is yet another objective of the present invention to provide a soldering method of a soldering jig, which can prevent a poor contact at soldering points.

It is yet another objective of the present invention to provide a soldering method of a soldering jig, which can obtain consistent specifications for the soldering points to facilitate the subsequent process.

It is yet another objective of the present invention to provide a soldering method of a soldering jig, which can enhance the whole efficiency.

To achieve the above objectives, the present invention provides a soldering jig comprising a substrate and at least one positioning part. The substrate has a soldering area and at least one positioning area disposed outside of the soldering area. The at least one positioning part is disposed in the positioning area to position a workpiece; the workpiece is placed in the soldering area and the positioning area; the workpiece has a soldering portion corresponding to the soldering area and at least one non-soldering portion corresponding to the positioning area.

The present invention also provides a soldering method comprising the steps of providing a substrate having a soldering area and at least one positioning area in which a positioning part is disposed in the positioning area, placing a workpiece on the substrate, positioning the workpiece through the positioning part, using a heating method to remove an isolating film on the workpiece, and placing a piece of solder in the soldering area of the substrate and then melting the piece of solder such that the workpiece is soldered to the soldering area through the piece of solder.

In one embodiment, a circular wall is disposed at the outer edge of the substrate and the positioning area has a first protruding recess which protrudes out of the circular wall.

In one embodiment, the positioning area has a second protruding recess which protrudes out of the circular wall; the first protruding recess and the second protruding recess lie on a straight line.

In one embodiment, the positioning part is a twin adhesive or an adhesive.

In one embodiment, the workpiece is a magnet wire.

DETAILED DESCRIPTION OF THE INVENTION

Figure 1A:
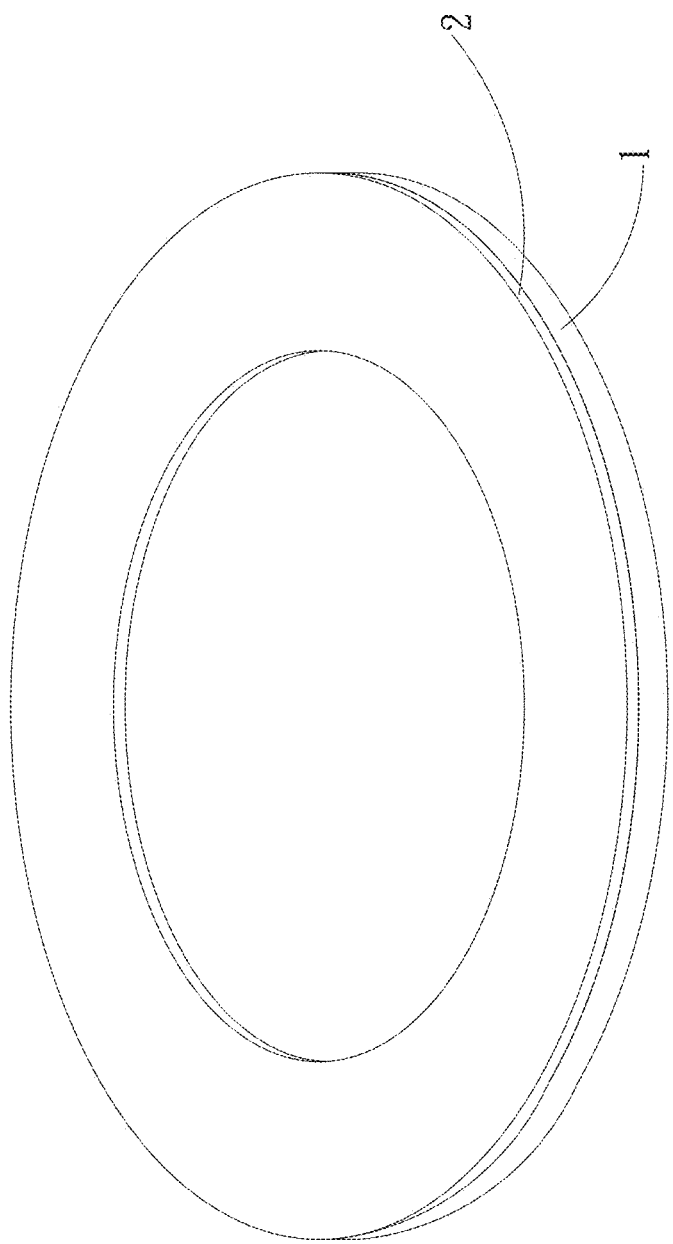
FIG. 1A is a perspective view of the soldering jig according to the first embodiment of the present invention.
Figure 1B:
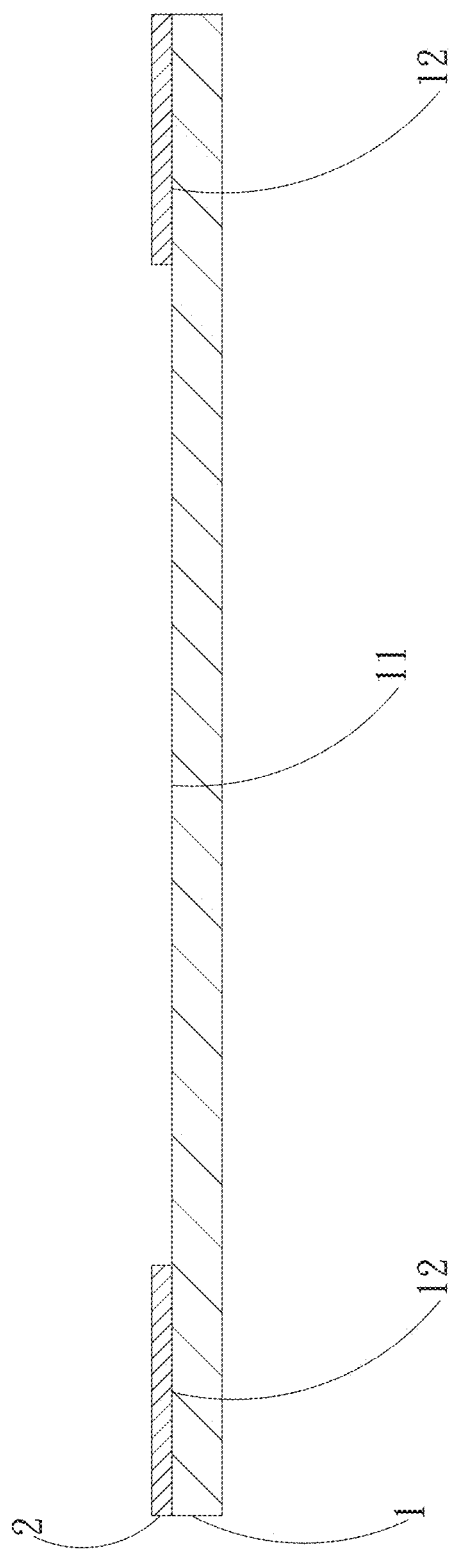
FIG. 1B is a cross-sectional view of the soldering jig according to the first embodiment of the present invention.

The above objectives, the structural and functional characteristics of the present invention will be described according to the preferred embodiments with the accompanying figures.

Please refer to FIGS. 1A, 1B, 1C, and 1D, which are the perspective view, the cross-sectional view, the operational view, and the another operational view of the soldering jig according to the first embodiment of the present invention, respectively. The present invention comprises a substrate 1 and at least one positioning part 2. The substrate 1 has a soldering area 11 and at least one positioning area 12 disposed at the outer edge of the soldering area 11. The positioning part 2 is disposed in the positioning area 12. The positioning part 2 can be a twin adhesive or an adhesive. The substrate 1 may have any shape like a circle, a regular polygon, or an irregular polygon.

The workpiece 3, not limited to a magnet wire, has a soldering portion 31, at least one non-soldering portion 32, and an isolating film 33 on a top of the workpiece 3. The soldering portion 31 is disposed corresponding to the soldering area 11 and the non-soldering portion 32 is disposed corresponding to the positioning area 12.

Figure 1C:
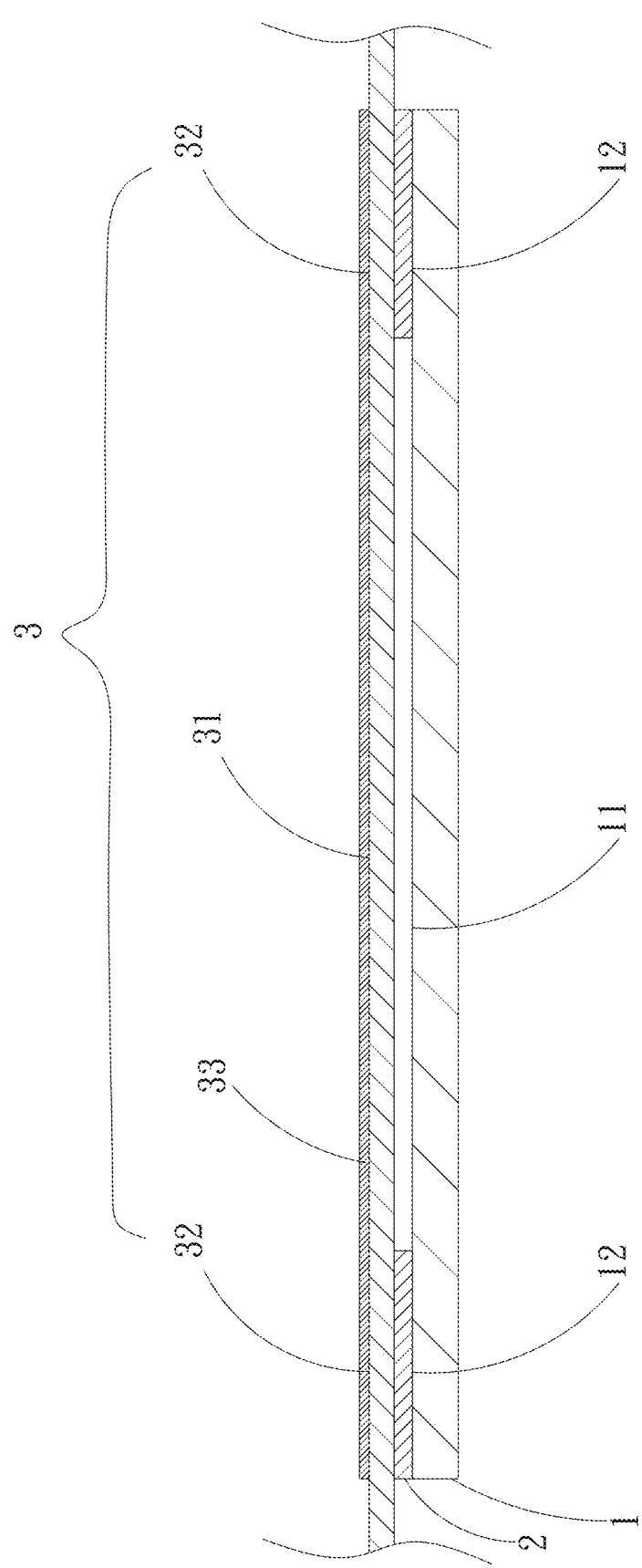
FIG. 1C is an operational view of the soldering jig according to the first embodiment of the present invention.

Referring to FIG. 1C, in operation, the workpiece 3 is placed on the substrate 1. The soldering portion 31 is aligned with the soldering area 11 and the non-soldering portion 32 is aligned with the positioning area 12. The positioning part 2 on the positioning area 12 will stick to the non-soldering portion 32 such that the workpiece 3 cannot be moved easily to be secured.

Figure 1D:
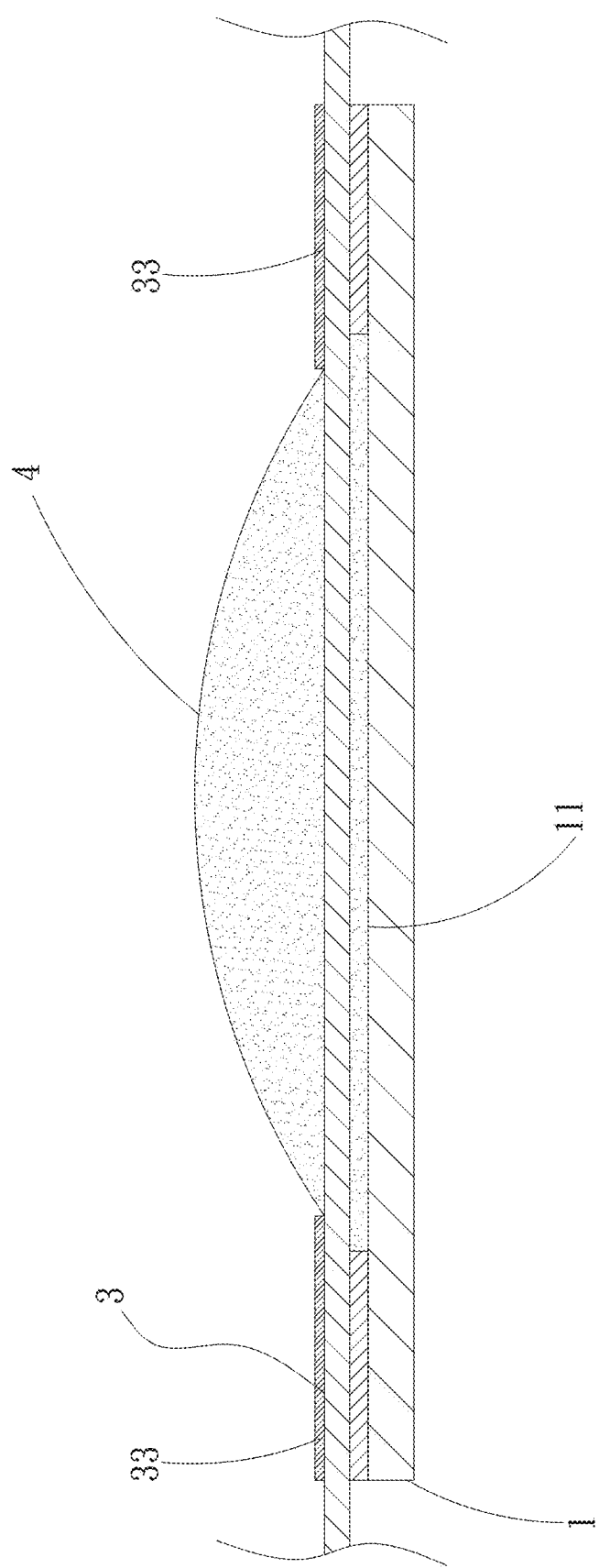
FIG. 1D is another operational view of the soldering jig according to the first embodiment of the present invention.

Please refer to FIG. 1D. When the soldering process is performed, the isolating film 33 on the top of the workpiece 3 is partially removed using a heating method, for example, but not limited to, the laser heating, the butt welding, or other equivalent methods and then a piece of solder 4 is placed in the soldering area 11 of the substrate 1. Next, the piece of solder 4 is heated and melted using the heating method, for example, but not limited to, the laser heating, the butt welding, or other equivalent methods such that the workpiece 3 is soldered and fixed to the soldering area 11.

The above-mentioned positioning part 2 uses a twin adhesive or an adhesive to fix the workpiece 3 in an adhesive way. Also, the positioning part 2 can be a magnetic object such as a magnet or an electromagnet to fix the workpiece 3 in a magnetic-fixing way.

Figure 2A:
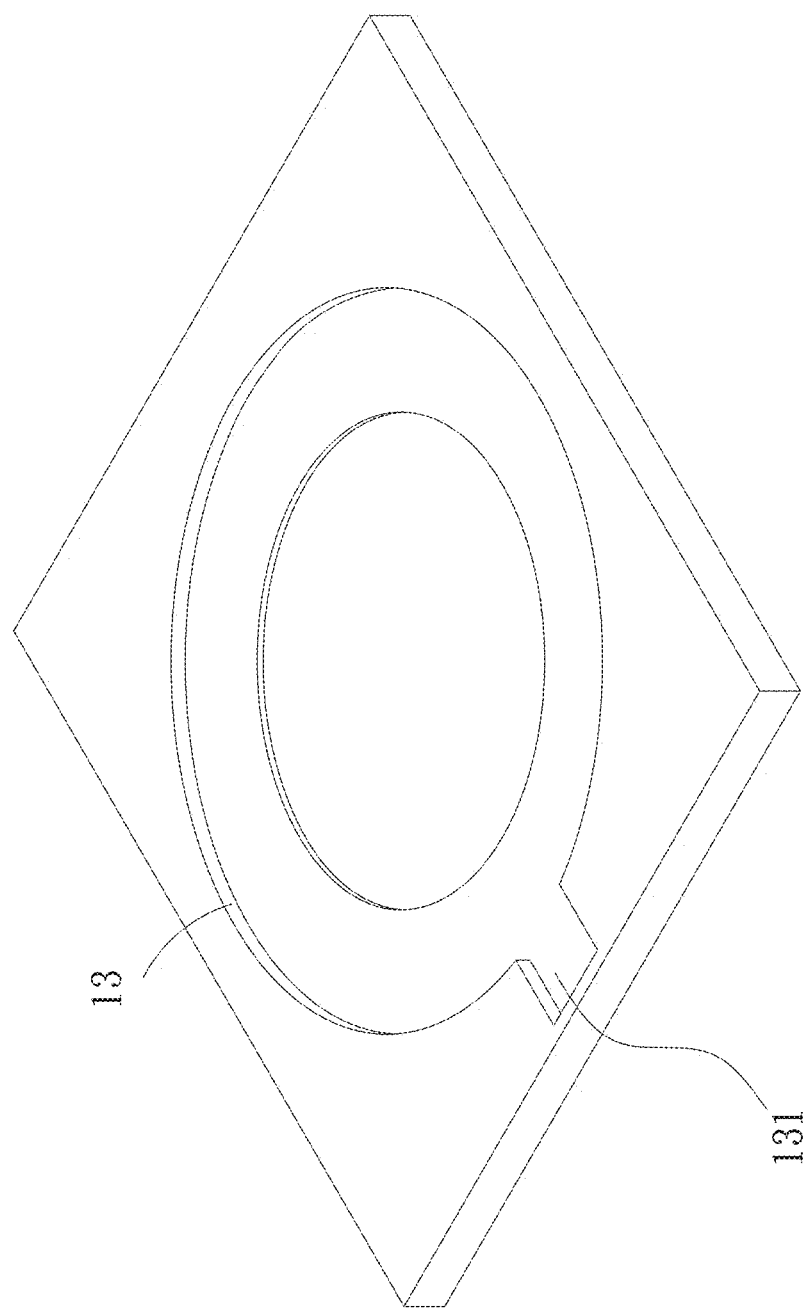
FIG. 2A is a perspective view of the soldering jig according to the second embodiment of the present invention.
Figure 2B:
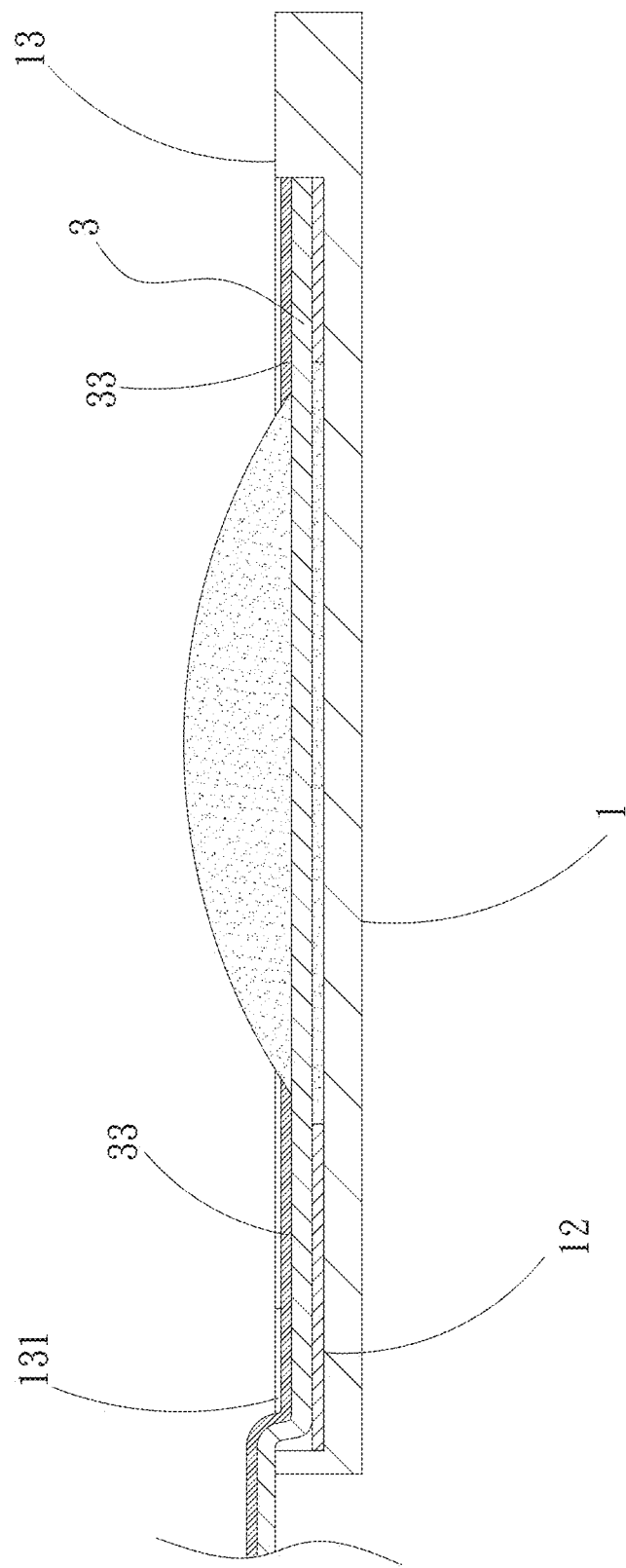
FIG. 2B is an operational view of the soldering jig according to the second embodiment of the present invention.

Please refer to FIGS. 2A and 2B, which are the perspective view and the operational view of the soldering jig according to the second embodiment of the present invention, respectively. Some structures in the second embodiment are the same as those in the first embodiment and will not be described here again. The main difference between the first and the second embodiments is that, in the second embodiment, a circular wall 13 is disposed at the outer edge of the substrate 1. The circular wall 13 has a first protruding recess 131 which is disposed corresponding to the positioning area 12 and protrudes out of the circular wall 13. The length and the width of the first protruding recess 131 may change based on the specification of the workpiece 3 like the wire diameter and based on the use. The first protruding recess 131 places a constraint on the workpiece 3 horizontally.

Figure 3A:
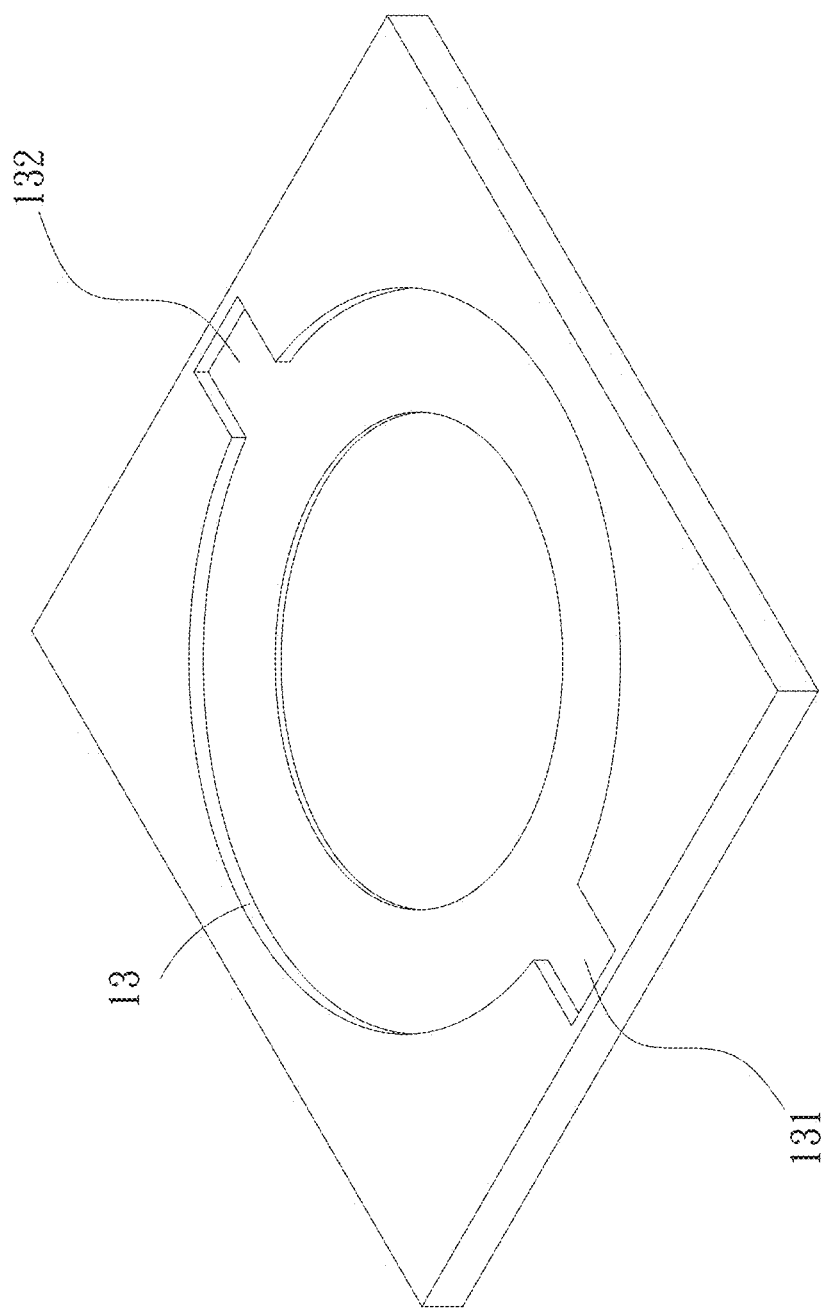
FIG. 3A is a perspective view of the soldering jig according to the third embodiment of the present invention.
Figure 3B:
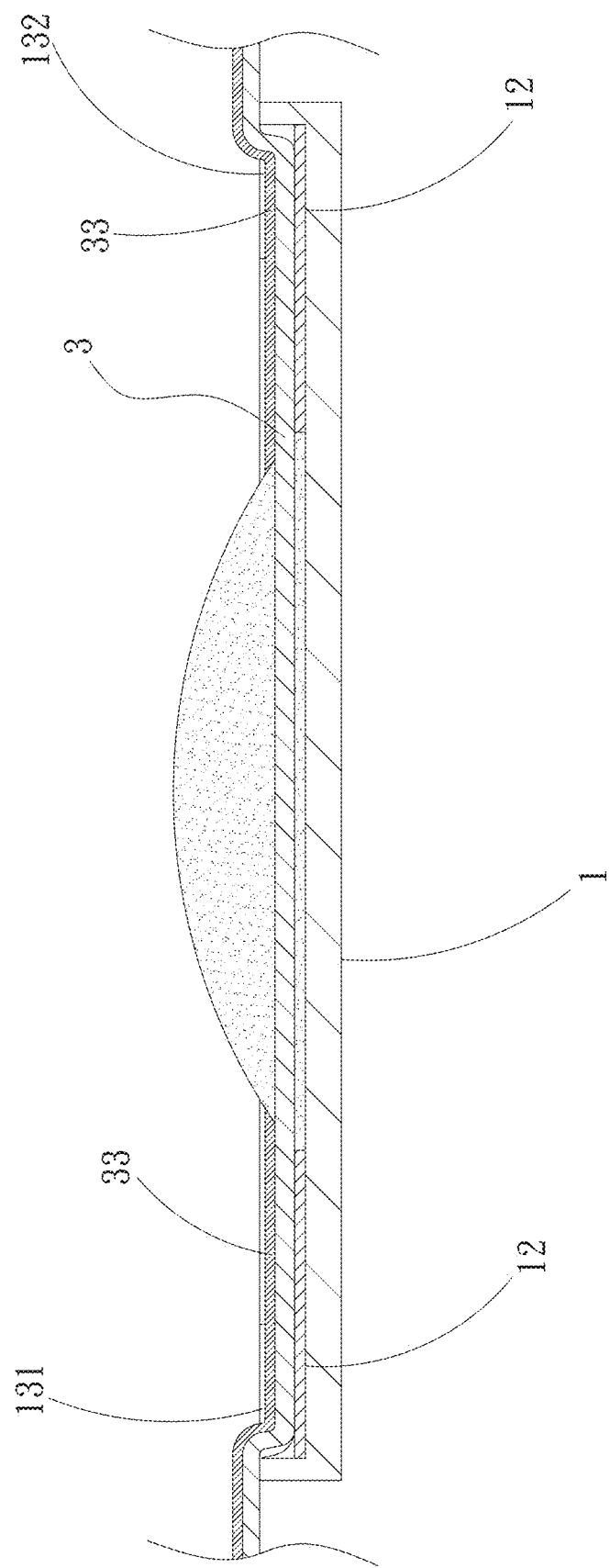
FIG. 3B is an operational view of the soldering jig according to the third embodiment of the present invention.

Please refer to FIGS. 3A and 3B, which are the perspective view and the operational view of the soldering jig according to the third embodiment of the present invention, respectively. Some structures in the third embodiment are the same as those in the first embodiment and will not be described here again. The main difference between the first and the third embodiments is that, in the third embodiment, a circular wall 13 is disposed at the outer edge of the substrate 1; the circular wall 13 has a first protruding recess 131 and a second protruding recess 132. The first protruding recess 131 and the second protruding recess 132 are disposed corresponding to the positioning area 12, both protruding out of the circular wall 13, and lying on a straight line. The lengths and the widths of the first and second protruding recesses 131, 132 may change based on the specification of the workpiece 3 like the wire diameter and based on the use. The first and second protruding recesses 131, 132 place a constraint on the workpiece 3 horizontally and ensure that the workpiece 3 remains straight.

Figure 4:
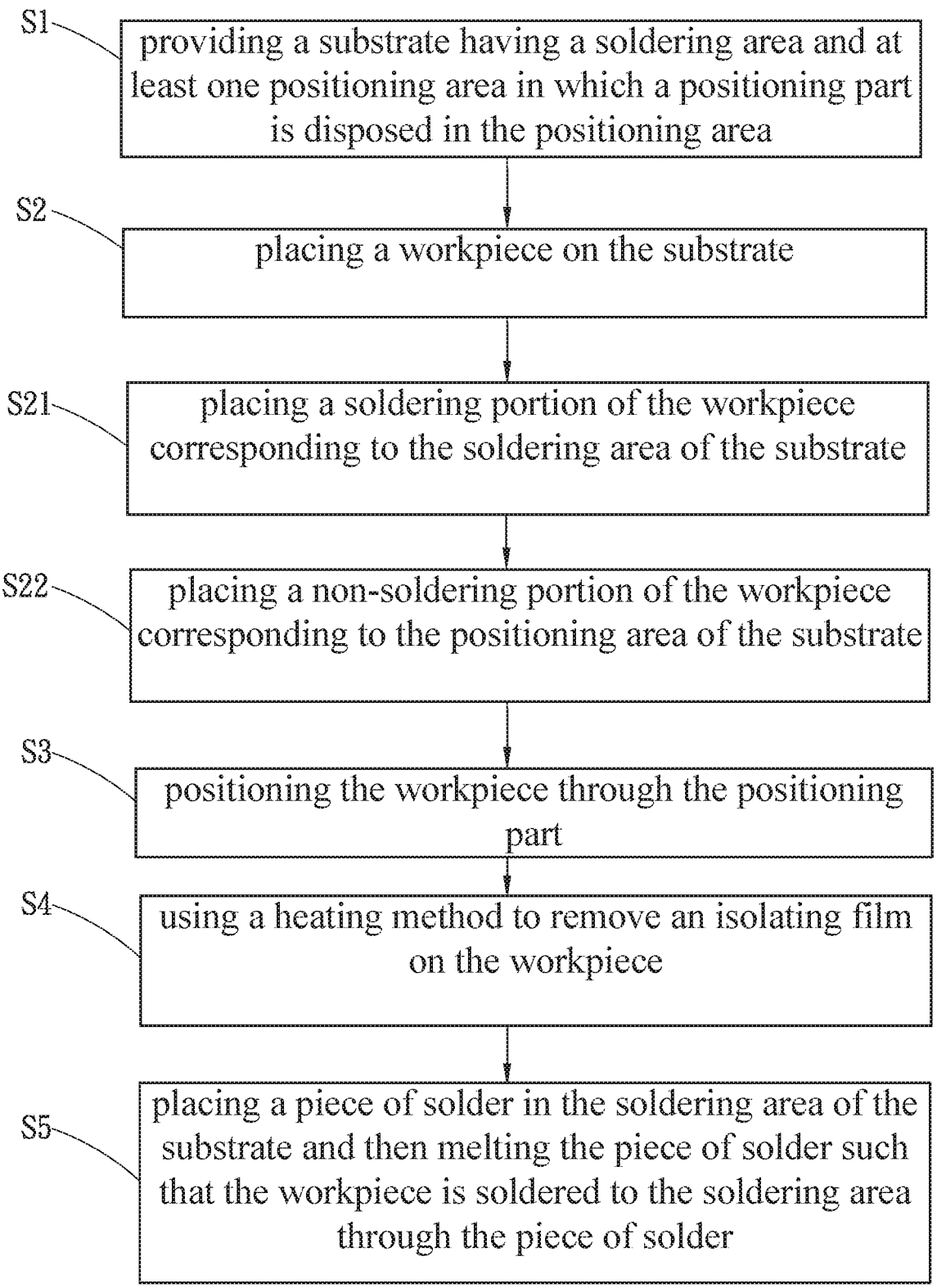
FIG. 4 is the flow chart of the soldering method of the present invention.

Please refer to FIG. 4 together with FIGS. 1A-1D. FIG. 4 is the flow chart of the soldering method of the present invention. The soldering method comprises the steps below.

Step S1: providing a substrate having a soldering area and at least one positioning area in which a positioning part is disposed in the positioning area. As described above, the substrate 1 has a soldering area 11 and at least one positioning area 12; a positioning part 2, for example, a twin adhesive or an adhesive is disposed in the positioning area 12.

Step S2: placing a workpiece on the substrate. As described above, the workpiece 3 like a magnet wire is placed on the substrate 1.

Step S21: placing a soldering portion of the workpiece corresponding to the soldering area of the substrate. As described above, the soldering portion 31 of the workpiece 3 is disposed corresponding to the soldering area 11.

Step S22: placing a non-soldering portion of the workpiece corresponding to the positioning area of the substrate. As described above, the non-soldering portion 32 of the workpiece 3 is disposed corresponding to the positioning area 12.

Step S3: positioning the workpiece via the positioning part. As described above, the non-soldering portion 32 of the workpiece 3 will be fixed by the positioning part 2 such that the workpiece 3 is firmly fixed on the substrate 1.

Step S4: using a heating method to remove an isolating film 33 on the workpiece. As described above, the isolating film 33 on the workpiece 3 like a magnet wire is melted and removed using a heating method, for example, but not limited to, the laser heating, the butt welding, or other equivalent methods.

Step S5: placing a piece of solder in the soldering area of the substrate and then melting the piece of solder such that the workpiece is soldered to the soldering area via the piece of solder. As described above, the solder 4 like solder paste or soldering tin is placed on the soldering area 11. Then, the soldering area 11 is heated to melt the solder 4. The melted solder 4 wraps and solders the workpiece 3 to the soldering area 11.

The above heating method in Step S4 can be performed by a manual soldering iron or by the laser heating of automatic equipment to remove the isolating film 33. In Step S5, the heating temperature/time and related parameters can be controlled precisely by controlling the amount of the solder 4 and using automatic equipment such as a reflow over or a laser welding machine. Thus, the same quality for each soldering point can be ensured.

Compared with the traditional manual soldering process, the present invention has the following advantages by means of the above-mentioned structure and method.

(1) The skill requirements are reduced. Any ordinary worker who can operate the automatic heating machine or the soldering machine step by step is qualified.

(2) The rupture of a magnet wire can be prevented.

(3) The quality issues regarding soldering points are decreased.

(4) The soldering results of the soldering points are consistent, which effectively controls the heights of the solder points and prevents interference with other parts.

(5) The efficiency is enhanced.

The detailed description of the present invention is given above. The embodiments described above are only preferred ones of the present invention. All the equivalent modifications and variations using the methods, shapes, structures, and apparatus in the specification and figures of the present invention should be embraced by the claimed scope of the present invention.

What is claimed is:

1. A soldering method comprising the steps of:
providing a substrate having a soldering area and at least one positioning area, wherein a positioning part is disposed in the positioning area;
placing a workpiece on the substrate;
securing the workpiece to the substrate via the positioning part;

using a heating method to partially remove an isolating film from the workpiece; and placing a piece of solder on the soldering area of the substrate and then melting the piece of solder such that the workpiece is soldered to the soldering area via the piece of solder.

2. The soldering method according to claim 1, further comprising the step of disposing a soldering portion of the workpiece aligned to the soldering area of the substrate.

3. The soldering method according to claim 1, further comprising the step of disposing a non-soldering portion of the workpiece aligned to the positioning area of the substrate.

4. The soldering method of claim 1, wherein the positioning part is an adhesive.

\* \* \* \* \*